April 21, 1970  J. D. HALL  3,507,536
CHUCK WAGON CAMPER
Filed Jan. 23, 1968  5 Sheets-Sheet 2
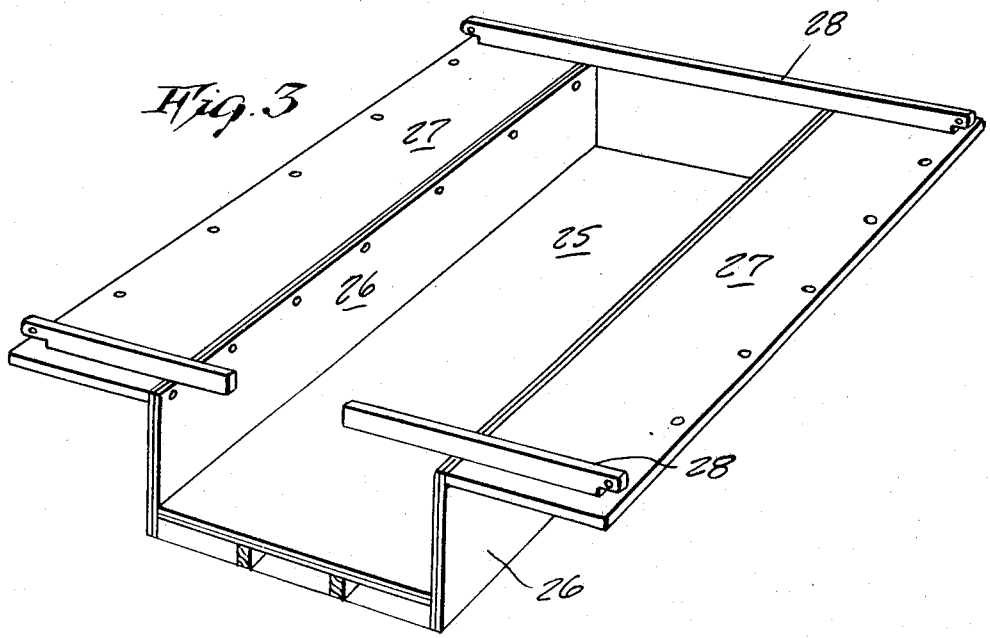
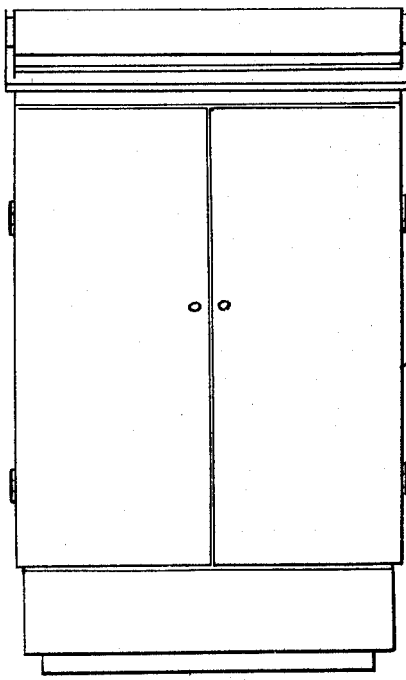 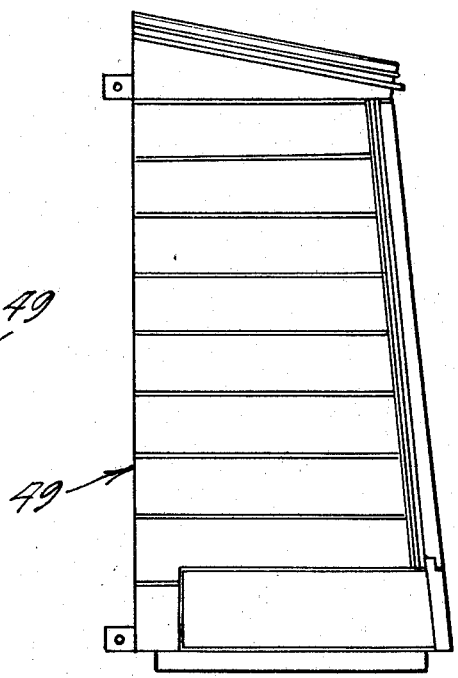
INVENTOR:
JOSHUA D. HALL April 21, 1970  J. D. HALL  3,507,536
CHUCK WAGON CAMPER
Filed Jan. 23, 1968  5 Sheets-Sheet 3
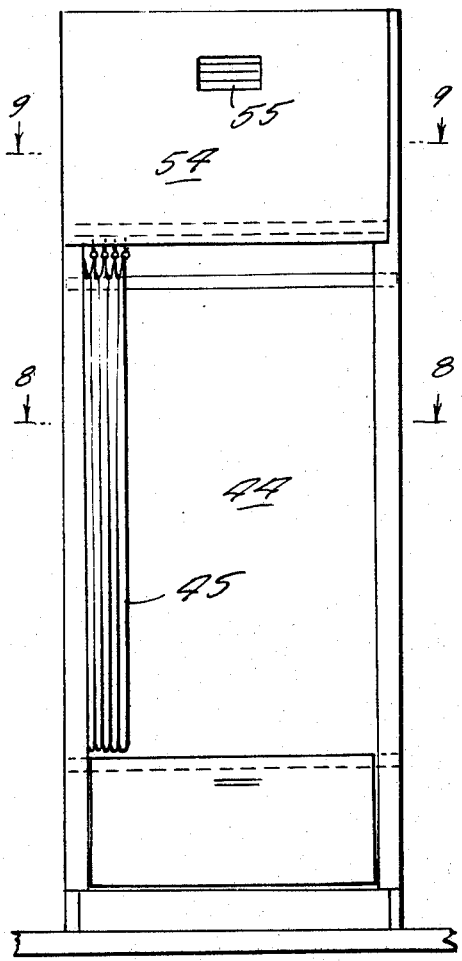
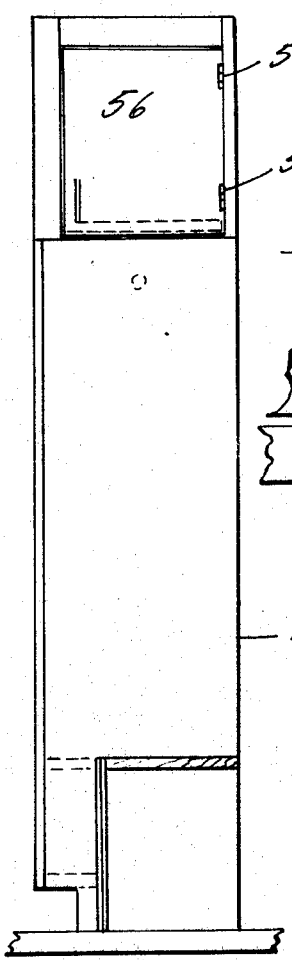
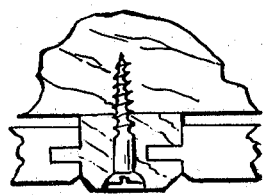
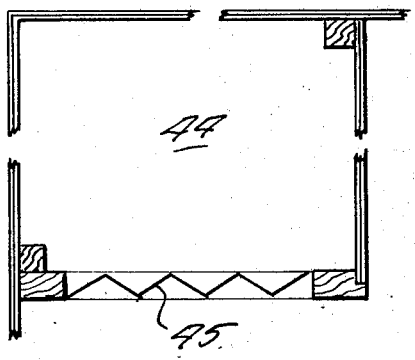
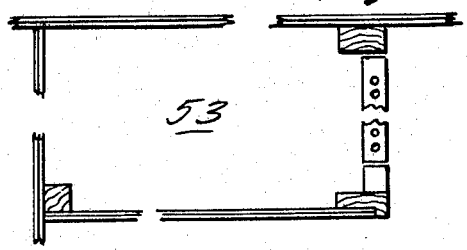
INVENTOR.
JOSHUA. D. HALL April 21, 1970 J. D. HALL 3,507,536
CHUCK WAGON CAMPER
Filed Jan. 23, 1968 5 Sheets-Sheet 4
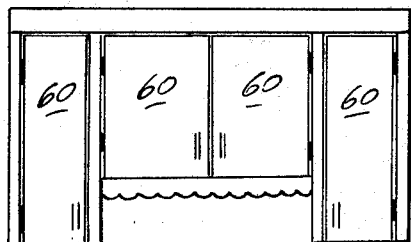
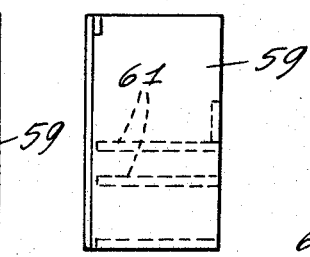
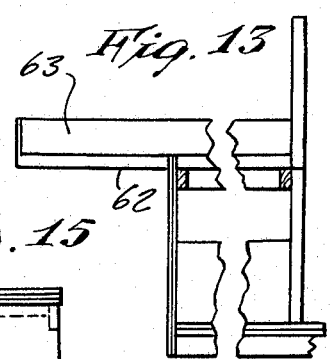
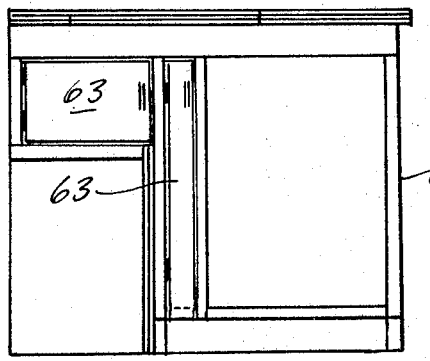
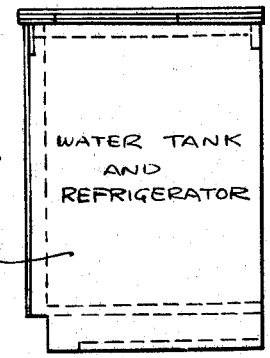
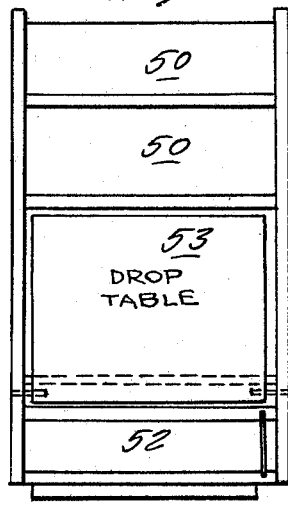
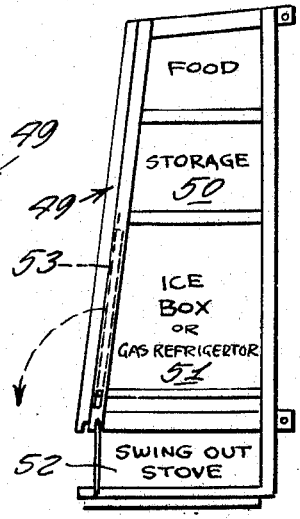
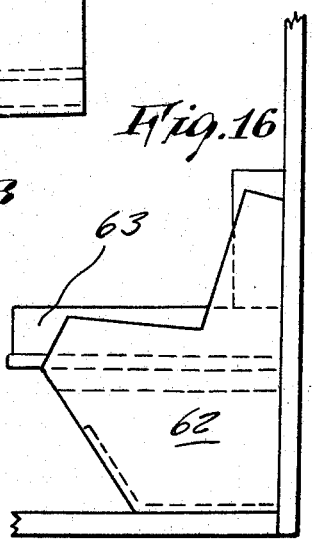
INVENTOR.
JOSHUA D. HALL

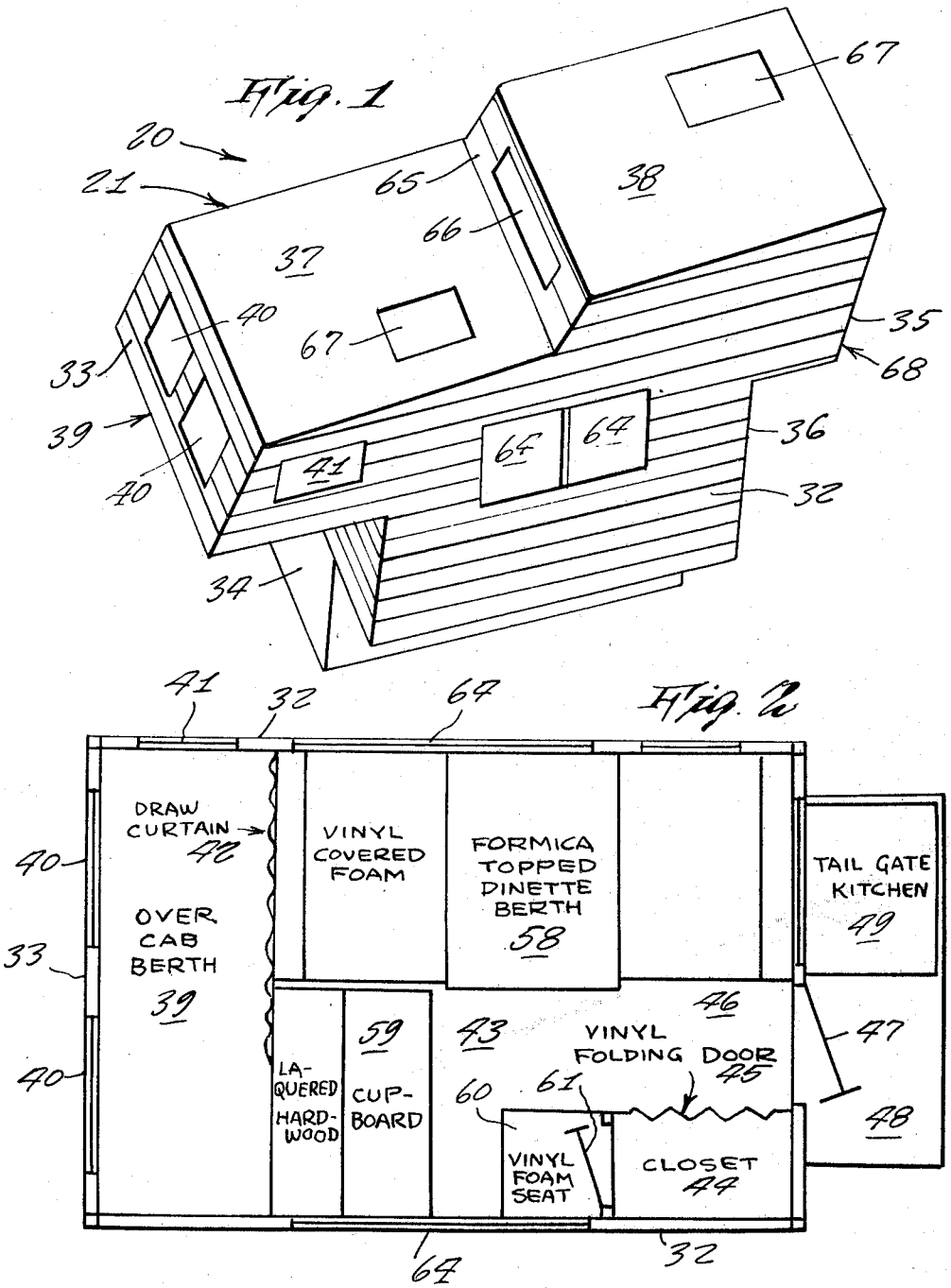

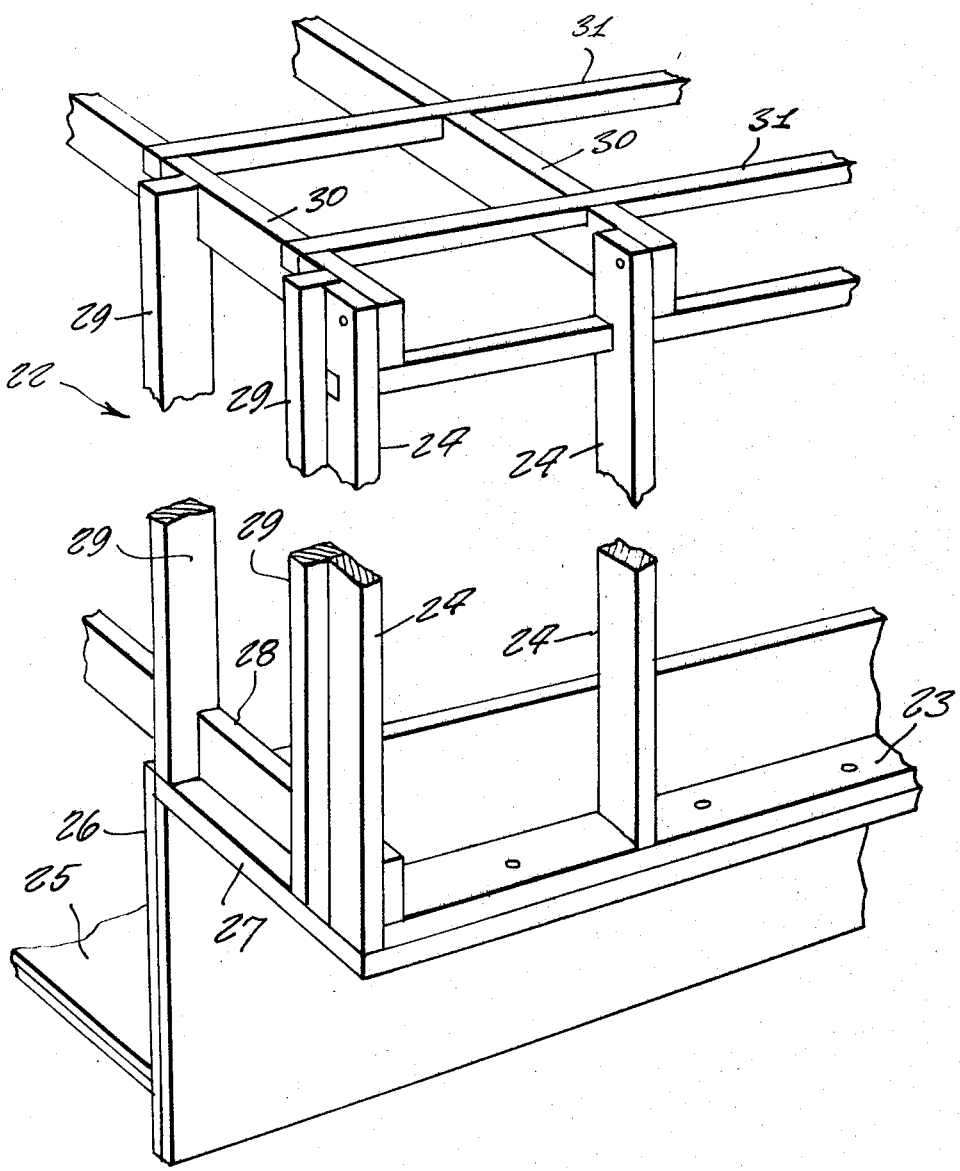

United States Patent Office 3,507,536
Patented Apr. 21, 1970

3,507,536
CHUCK WAGON CAMPER
Joshua D. Hall, North Little Rock, Ark.
(1817 Senator Ave., Texarkana, Ark. 75501)
Filed Jan. 23, 1968, Ser. No. 699,905
Int. Cl. B60p 3/32
U.S. Cl. 296—23     2 Claims

ABSTRACT OF THE DISCLOSURE

An improved camper having a tailgate chuck box which features in addition to storage space, a dropleaf work table, a built-in ice box or refrigerator and a swing-out two-burner propane gas cooking stove.

---

This invention relates generally to pickup campers.

A principal object of the present invention is to provide an improved pickup camper having a tailgate chuck box which includes storage space, a dropleaf work table, a built-in ice box or refrigerator and a swing-out two-burner propane gas cooking stove, thus reducing the hazard of cooking inside, maintaining a more sanitary interior of the camper, increasing storage space within the inside cupboard, and eliminating steps to and from the camper while cooking for outdoor camp setup.

Another object of the present invention is to provide a chuck wagon camper wherein the tailgate chuck box may be used as a game box for hunting trips.

Yet another object of the present invention is to provide a chuck wagon camper having a prefabricated frame that can be readily knocked down, thus providing economy in shipping space and ease of assembly.

Other objects of the present invention are to provide a chuck wagon camper which is simple in design, inexpensive to manufacture, rugged in construction, easy to use and efficient in operation.

These and other objects will be readily evident upon a study of the following specification and the accompanying drawings wherein:

FIGURE 1 is a perspective view of a chuck wagon pickup camper incorporating the present invention, FIGURE 2 is a plan view of a plainsman model thereof, FIGURE 3 is a perspective view of the base portion thereof, FIGURE 4 is a front elevation view of a chuck box comprising a component of the present invention, FIGURE 5 is a side elevation view thereof, FIGURE 6 is a front elevation view of a clothes closet and a pillow locker, FIGURE 7 is a side elevation view thereof, FIGURE 8 is a cross sectional view taken on the line 8—8 of FIGURE 6.

FIGURE 9 is a cross sectional view taken on the line 9—9 of FIGURE 6,

FIGURE 10 is an enlarged detailed view of a ceiling element,

FIGURE 11 is a front elevation view of a cupboard,

FIGURE 12 is a side elevation view thereof,

FIGURE 13 is a cross sectional vew of a dinette member,

FIGURE 14 is a front elevation view of a kitchen cabinet,

FIGURE 15 is a side elevation view thereof,

FIGURE 16 is an end elevation view of a dinette member,

FIGURE 17 is a front elevation view of a chuck box framing,

FIGURE 18 is an end elevation view thereof, and

FIGURE 19 is a perspective view showing a complete frame detail of an entire corner.

Referring now to the drawings in detail, the reference numeral 20 represents a chuck wagon camper, according to the present invention, wherein there is a housing 21 that may be conveniently carried upon a pickup vehicle.

As shown in FIGURE 19, the housing is constructed having a prefabricated frame 22 of knock-down type, the frame including a bottom frame support 23 upon which there are mounted a plurality of upstanding sidewall studs 24, a flooring 25, a vertical step foundation 26, as well as a horizontal step foundation 27, a plurality of lower cross member supports 28 positioned over the horizontal step foundation, a plurality of upward extending rear wall studs 29 extending upwardly from the lower cross member support, the upper end of the sidewall studs and rear wall studs supporting roof supports 30 across which there extends a plurality of roof battens 31. To this framework there is secured the board structure that forms the sidewalls 32, the end walls 33, 34, 35 and 36, as well as the roof 37 and 38.

As is shown in FIGURE 1 of the drawing, the housing may be irregularly configurated and may include an overhang front portion 39 that comprises an over-cab berth. The end wall 33 of the over-cab berth 39 may be provided with a pair of windows 40, the over-cab berth also having a side window 41 on the sidewalls 32. The over-cab berth may be separated on the interior from the remainder of the housing interior by a draw curtain 42, shown in FIGURE 2 of the drawing.

The remaining interior 43 of the camper housing is made to contain a closet 44 having a vinyl folding door 45 in one corner. A walk-away space 46 in front of the closets leads to a rearwardly pivotable door 47 that opens out upon a tailgate 48. The tailgate has a kitchen 49 mounted thereupon.

The tailgate kitchen 49 includes a food storage space 50, an ice box or gas refrigerator 51, a swing-out two-burner propane gas cooking stove 52, and the tailgate kitchen further includes a drop table 53, wherein the table leaf is pivotable between a retracted and a utility position, as indicated by the arrow in FIGURE 18. It is to be noted that the tailgate kitchen is likewise comprised of a knock-down frame over which wall panels are secured.

As shown in FIGURES 6 and 7, a pillow locker 53 is built over the clothes closet 44, a front wall 54 of the pillow locker having a louvered or vented opening 55 to prevent mustiness forming therein, the pillow locker having an access door 56 on one side pivotable about hinges 57.

Within the housing interior 43, there is also located a Formica topped dinette berth 58, a cupboard 59, a vinyl foam seat 60 behind a door 61 of the closet 44, the housing interior further including a floor mounted kitchen cabinet 62 of conventional design having access doors 63 to space within the cabinet for purpose of storage of various items as well as including space for a water tank and refrigerator, as is shown in FIGURES 14 and 15 of the drawing.

Above the floor mounted kitchen cabinet, there may be a wall mounted cupboard 59, as illustrated in FIGURES 11 and 12 of the drawing. This cupboard may likewise be provided with a plurality of access doors 60 to gain entrance to shelves 61 within the cupboard and upon which dishes and other kitchen accessories may be stored.

Within the housing interior, there may be also included a dinette 62 illustrated in FIGURES 13 and 16. A cushion 63 may be mounted upon the dinette 62, as shown in FIGURE 13.

It is to be noted that the cupboard 59 is designed principally for containing utensils and food only, whereas the tailgate kitchen contains the stove, ice box or refrigerator and additional storage space.

As shown in the chuck wagon and plainsman model in FIGURE 1 and FIGURE 2, it is to be noted that the sidewalls 32 are provided with additional windows 64 so to provide sufficient light gaining access thereinto. Additionally, an intermediate wall 65 between the different elevation of roofs 37 and 38 is also provided with a window 66, shown in FIGURE 1 of the drawing. Each of the roof members 37 and 38 may be provided with vents 67 therein so to assure a refreshing air at all times within the interior of the housing.

The rear end of the chuck wagon camper may also include a rearward extending overhang 68, the rear wall 35 of which may also include a window such as is shown upon the front wall 33 of the front overhang. The rear overhang 68 is of course located above the tailgate kitchen 49.

It is to be noted that the chuck wagon camper framing may be designed so as to appeal to builder hobbyists or sportsmen so that the manufacturer may ship the same in disassembled position and the hobbyist or sportsman may then assemble the same, thus saving on assembly costs, and also allowing the same to be shipped in knockdown condition at a relatively lower cost.

It is also to be noted that the hollow wall construction that is possible with the present device is suitable for insulation superior to modern, but common laminated aluminum, Polyfoam and plywood. The present design also does not permit the paneling to become separated from the wall due to attack of water, moisture, heat or other extreme temperature change. The present construction is noted to be readily adaptable for being finished in fancy lacquers or other hard finish paints. A commercial acoustical ceiling tile may be readily adaptable to be installed. The camper windows may be of standard mobile home type and may accordingly include aluminum frames with safety glass and matching screens.

Thus there has been shown an improved chuck wagon camper.

While various changes may be made in the detail construction, it is to be noted that such changes will be within the spirit and scope of the present invention.

What I now claim is:

1. A chuck wagon camper having a housing comprising a framework upon which paneling is mounted comprising horizontal flooring, a plurality of vertically extending step foundations, a sidewardly horizontal step foundation adjacent to each vertical step foundation, a bottom frame support above the outer edges of said horizontal step foundation, a lower cross member support extending across the side ends of said horizontal step foundations, a plurality of upwardly extending sidewall studs and rear wall studs over said bottom frame supports and said lower cross member supports, the upper ends of said wall studs supporting a plurality of roof supports, and said roof supports having a plurality of roof battens mounted transversely thereacross, a tailgate having a kitchen mounted thereupon including a chuck box having storage space, a built-in refrigerator, a swing-out two-burner propane cooking stove, a dropleaf work table having a leaf pivotable between storage and utility positions, an access door adjacent to said tailgate and communicating with a walk-away space within the interior of said housing, a closet adjacent one side of said walk-away space, said housing further including a fowardly extending overhang containing an over-cab berth therewithin, said over-cab berth being separated from the remaining interior of said housing by a drawstring, and said housing having a rearwardly extending overhang located over said tailgate kitchen.

2. The combination of claim 1, said closet having a vinyl folding door, a pillow locker located above said door, a door adjacent one side of said closet to provide access to a vinyl foam seat, said seat being located adjacent one side of said closet, and a plurality of other fixtures located within said housing including a Formica topped dinette berth, a floor mounted kitchen cabinet, a wall mounted cupboard and a dinette for seating purposes.

References Cited

UNITED STATES PATENTS

| | | | |
|---|---|---|---|
| 3,050,330 | 8/1962 | Willson | 296—23 |
| 2,867,471 | 1/1959 | Coon | 296—23 |
| 2,803,855 | 8/1957 | Suter | 296—23 X |
| 3,297,355 | 1/1967 | Robinson | 296—23 |
| 3,257,760 | 6/1966 | Calthorpe | 296—23 |
| 3,186,754 | 6/1965 | Winstead | 296—23 |

FOREIGN PATENTS 256,149    9/1963    Australia.

PHILIP GOODMAN, Primary Examiner